(12) United States Patent
Smith et al.

(10) Patent No.: US 10,591,206 B2
(45) Date of Patent: Mar. 17, 2020

(54) METHOD AND SYSTEM FOR DEVICE WITH EUTECTIC PLATE

(71) Applicant: C. NELSON MFG., Oak Harbor, OH (US)

(72) Inventors: Kellen R. Smith, Port Clinton, OH (US); Bryan J. Rimboch, Oak Harbor, OH (US)

(73) Assignee: C. NELSON MANUFACTURING COMPANY, Oak Harbor, OH (US)

( * ) Notice: Subject to any disclaimer, the term of this patent is extended or adjusted under 35 U.S.C. 154(b) by 76 days.

(21) Appl. No.: 15/448,715

(22) Filed: Mar. 3, 2017

(65) Prior Publication Data

US 2017/0284731 A1  Oct. 5, 2017

Related U.S. Application Data

(60) Provisional application No. 62/317,685, filed on Apr. 4, 2016.

(51) Int. Cl.
| | |
|---|---|
| *F25D 29/00* | (2006.01) |
| *H02J 3/14* | (2006.01) |
| *H05B 1/02* | (2006.01) |
| *F24C 7/10* | (2006.01) |
| *F25D 16/00* | (2006.01) |

(52) U.S. Cl.
CPC ............. *F25D 29/00* (2013.01); *F24C 7/10* (2013.01); *H02J 3/14* (2013.01); *H05B 1/0258* (2013.01); *F25D 16/00* (2013.01); *Y02B 30/762* (2013.01); *Y02B 70/3225* (2013.01); *Y02B 70/3266* (2013.01); *Y04S 20/222* (2013.01); *Y04S 20/242* (2013.01)

(58) Field of Classification Search
CPC .. F24C 7/08; F25D 16/00; F25D 29/00; H02J 3/14; Y02B 70/3225; Y04S 20/222
USPC ......................................................... 236/1 C
See application file for complete search history.

(56) References Cited

U.S. PATENT DOCUMENTS

| | | | | |
|---|---|---|---|---|
| 4,337,401 A | * | 6/1982 | Olson | ............... G05D 23/1934 307/39 |
| 5,293,028 A | * | 3/1994 | Payne | .................. F24C 15/106 219/485 |
| 5,486,725 A | * | 1/1996 | Keizer | ..................... F24C 7/08 307/116 |
| 9,848,631 B2 | * | 12/2017 | Painter | .................... A23L 13/60 |

(Continued)

*Primary Examiner* — Henry T Crenshaw
(74) *Attorney, Agent, or Firm* — Tucker Ellis LLP

(57) ABSTRACT

A system and/or method is provided that manages delivery of power for a device and an additional device. The system can include a device that consumes power to refrigerate an item stored therein, wherein the device includes an eutectic plate and an additional device that consumes power. The system can further include a power source that is configured to deliver power and a power manager component that is configured to monitor a temperature within the device. The power manager component can further be configured to activate the power source to deliver power to the device to reach a set temperature, switch the delivery of power from the device to the additional device based on the set temperature being reached, and maintain the set temperature in the device by switching delivery of power from the additional device to the device based on monitoring the temperature.

18 Claims, 9 Drawing Sheets

(56) References Cited

U.S. PATENT DOCUMENTS

| | | | | |
|---|---|---|---|---|
| 2004/0057177 | A1* | 3/2004 | Glahn | H02J 3/14 |
| | | | | 361/62 |
| 2005/0064354 | A1* | 3/2005 | Lerner | F23D 14/72 |
| | | | | 431/13 |
| 2005/0132733 | A1* | 6/2005 | Rafalovich | F25D 29/00 |
| | | | | 62/199 |
| 2006/0124628 | A1* | 6/2006 | Long | A47J 31/20 |
| | | | | 219/438 |
| 2008/0223052 | A1* | 9/2008 | Khosla | F25D 29/00 |
| | | | | 62/150 |
| 2010/0024449 | A1* | 2/2010 | Hwang | F24D 11/0214 |
| | | | | 62/113 |
| 2011/0270456 | A1* | 11/2011 | Kouda | H02J 3/14 |
| | | | | 700/292 |
| 2012/0097045 | A1* | 4/2012 | Kurimoto | F24C 7/087 |
| | | | | 99/331 |
| 2013/0085622 | A1* | 4/2013 | Rossi | H02J 3/14 |
| | | | | 700/295 |
| 2013/0200706 | A1* | 8/2013 | Cobb | H02J 4/00 |
| | | | | 307/35 |
| 2014/0336830 | A1* | 11/2014 | Williams | H02J 13/0013 |
| | | | | 700/286 |
| 2016/0238308 | A1* | 8/2016 | Uchida | F25D 17/065 |

\* cited by examiner

US 10,591,206 B2

METHOD AND SYSTEM FOR DEVICE WITH EUTECTIC PLATE

CROSS-REFERENCE(S) TO RELATED APPLICATIONS

This application claims priority to and the benefit of U.S. Application Ser. No. 62/317,685 filed on Apr. 4, 2016. The entirety of which is incorporated herein by reference.

BACKGROUND

Technical Field

Embodiments of the subject matter disclosed herein relate to managing the power source to one or more devices to reduce the need for additional power supplies or equipment utilizing eutectic cold plates, hot plates or other devices to store energy on at least one device which allows the devices to operate within specified temperatures or functions.

Discussion of Art

Governments often require permits or regulations for electrical systems, and in particular, power supplies. These regulations are for safety and the standardization of power supply systems. For instance, a power supply company can generate electricity, use a step-up transformer to deliver the electricity over high-voltage power lines to a step-down transformer. From the step-down transformer, power lines deliver the electricity to a home or company. From within the home or company, there can be infinite systems or distribution systems that include various components such as breakers, electrical wiring, load centers, electrical connectors, boxes, switches, outlets, among others.

In light of the numerous configurations and safety concerns, regulations often require costly and complex power supply systems. Construction to the home or company building or a change of equipment using the power supply often requires infrastructure changes. For instance, adding a power supply outlet may require adding an additional electrical wire from the breaker/fuse box or even adding a new circuit breaker for the power supply outlet.

BRIEF DESCRIPTION OF THE DRAWINGS

Reference is made to the accompanying drawings in which particular embodiments and further benefits of the invention are illustrated as described in more detail in the description below, in which.

DETAILED DESCRIPTION

Figure 1:
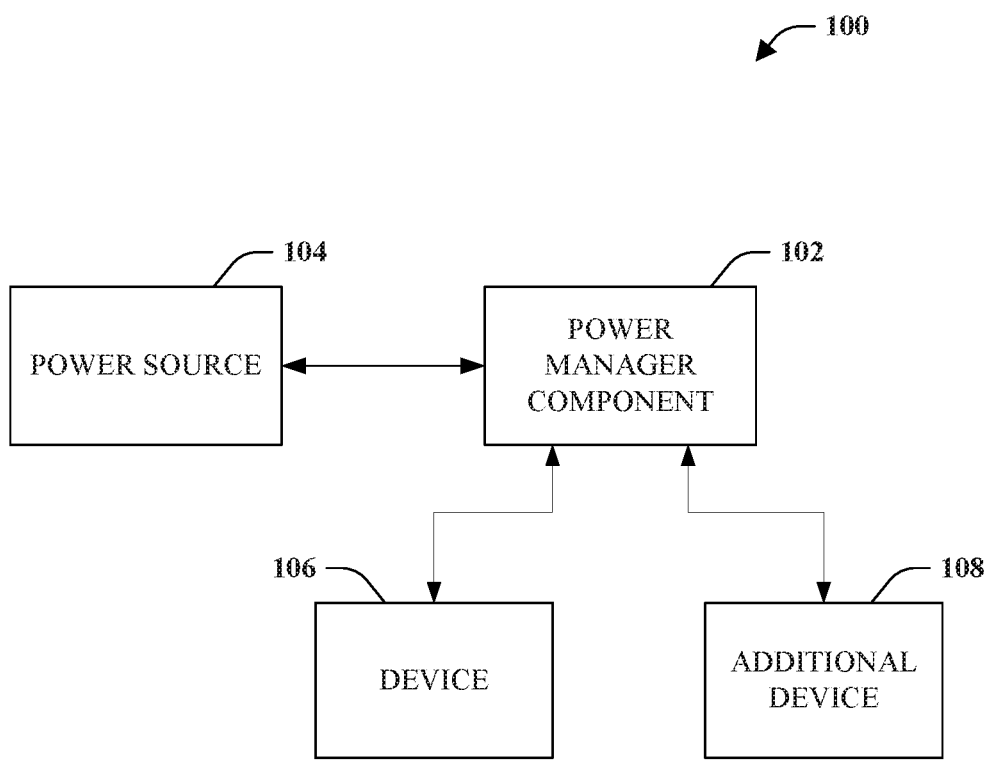
FIG. 1 is an illustration of a system that facilitates managing delivery of power for a device and an additional device in accordance with the subject innovation.

Embodiments of the present invention relate to switching power delivery between two or more devices based on a set temperature of at least one device that cools or refrigerates. In particular, a power manager component can be configured to switch power delivery between two or more devices so as to maintain a set temperature within the device that refrigerates, heats, or stores energy. The power manager component can be configured to monitor a temperature within a device that refrigerates or heats as well as include data related to the refrigerating or heating capabilities of such device. The power manager component can ensure delivery of power to the device that refrigerates or heats to maintain the set temperature as well as divert power from the device that refrigerates or heats for use by additional devices since the temperature loss or gain within the device that refrigerates or heats is mitigated by an eutectic plate that refrigerates or heats or an energy storage technique.

With reference to the drawings, like reference numerals designate identical or corresponding parts throughout the several views. However, the inclusion of like elements in different views does not mean a given embodiment necessarily includes such elements or that all embodiments of the invention include such elements.

The term "device" as used herein can be defined as a portion of hardware or software that can receive power from a power source.

The term "power source" as used herein can be defined as a component that generates, stores, or delivers electricity or power.

The term "eutectic plate" can heat or cool and can be referred to as a "holdover plate," a "hot plate" or a "cool plate." The eutectic plate can deliver heat or cold for hours.

The term "component" or "controller," as used herein can be defined as a portion of hardware, a portion of software, a portion of logic, or a combination thereof. A portion of hardware can include at least a processor and a portion of memory, wherein the memory includes an instruction to execute.

FIG. 1 illustrates a system 100 that facilitates delivering power with a power manager component 102. The system 100 includes the power manager component 102 that can be configured to switch power between devices, here, device 106 and an additional device 108. The power manager component 102 distributes power by activating/deactivating one or more devices, or by reducing power to one or more devices in order to maintain the system's 100 overall current load within the load constraint of the power source 104. In particular, the power manager component 102 can perform at least one of an activation, deactivation, a power reduction, or a reduction of functionality of the additional device 108 in order to manage the power to the device 106.

The system 100 eliminates infrastructure costs related to expanding the capabilities of the power source 104 such as outlets, breakers, wiring, etc. The power manager component 102 allows the power source 104 to be unmodified when the additional device 108 is introduced into the system 100. A conventional technique requires additional infrastructure such as an additional power source or an additional breaker/circuit, among others. Yet, the power manager component 102 can be configured to utilize the power source 104 for both the device 106 and the additional device 108, wherein a switching and/or management of the power delivery is performed by the manager component 102 based on a parameter. By way of example, and not limitation, the parameter can be a set temperature inside a housing of a device (e.g., the device 106), a temperature range, a set temperature with a tolerance or a threshold, a duration of time, a scheduled time or date, a detected motion within a storage area, an amount of product stored or housed within the device 106, a user input, among others. The power manager component 102 can control the additional device 108 by terminating power consumption by the additional device 108, reducing power consumption, and/or reducing a functionality or feature of the additional device 108 in order to divert power to the device 106, wherein such power diversion allows device 106 to maintain the parameter. It should be appreciated that power manager component 102 can control delivery of power or current for the system 100 and that the use of terms such as "power delivery" or "power level" implies "current delivery" or "current level" respectively, and vice versa.

The system 100 does not attempt to save energy but rather reduce the infrastructure costs associated with adding power equipment needed to expand the capabilities of the power source 104. For example, adding a refrigerating device may require a higher voltage line and/or breaker/circuits or even an additional power source. The subject innovation allows the power source 104 be used for the device 106 and the additional device 108 rather than adding a new power source or additional equipment. For example, an appliance can be added to a grouping of appliances with the use of the power manager component 102 and avoid the cost and expense of installing addition electrical supply to power the addition appliance. In an embodiment, the device can be a refrigeration appliance such as, but not limited to, an ice cream cart, a beverage cart, a cooler with a refrigerating element, an insulated compartment with a heating element or a cooling element, among others.

The device can further use, include, or integrate one or more holdover plates. The power manager component 102 can receive a set temperature and switch power between one or more devices or appliances to maintain the set temperature. The set temperature can be based on, for instance, the preservation of the product or items stored or housed in the device(s) or appliances. In an example, the set temperature can be for a food product to maintain food-safe temperatures. The power manager component 102 can turn off the device 106 such as a refrigerator or freezer for a duration of time and maintain the set temperature. This allows the additional device 108 (or multiple additional devices) to be powered while the device 106 is not powered and relying on the eutectic plate 302 to conserve the heat or cold stored therein. For instance, the additional devices 108 can be a hot water heater to use the available electric to heat up the water, or for an oven to be turned on for 30 minutes to cook food.

By way of example and not limitation, the device 106 can be a refrigerating device or a heating device. In a particular non-limiting embodiment, the device 106 can include a hot plate, a holdover plate, a heating element, a cooling element, a cold plate, an eutectic plate, or an eutectic component. The device 106 can include insulation or insulation features to mitigate loss of heat or cold therefrom. It should be appreciated that the device 106 can be any type of device that allows for thermal energy (hot or cold) storage, and does not necessarily require a eutectic plate and such example of the eutectic plate is one of various embodiments that can be selected with sound engineering judgment.

In certain embodiments, the system 100 can include a device 106 that is a heat-storing or a cold-storing device. For example, the device 106 can be, but is not limited to being, a freezer, refrigerated container, a hot water heater, and the like. The device 106 can be activated, deactivated, activated in a reduced power state, activated with reduced functionality, or a combination thereof based in part upon the energy storing capabilities. The system 100 can further include an additional device 108 that requires power from the power source 104. For example, the additional device 108 can be an electric device, a food preparation device (e.g., popcorn machine, cotton candy machine, nacho cheese warmer, pretzel warmer, soup kettle, a device that consumes electricity, and the like), a device used at a food service location (e.g., a cash register, a credit card swipe device, a computer, a digital menu displays, a barcode scanner, and the like), a device or component that plugs into an outlet for power, lighting equipment (e.g., signage, safety lighting, and the like), among others.

In another embodiment, the device 106 can be a heat or cold-storing device and the additional device 108 can also be a heat or cold-storing device. Device 106 can be activated based on a parameter associated with a temperature setting for the device 106. Based on the parameter, the device 106 can be controlled to ensure a target temperature is maintained. The additional device 108 can be powered on when needed, but can be deactivated automatically if necessary for device 106 to operate based on the parameter. In a related embodiment, the additional device 108 can be a heat or cold-storing device and can utilize a two stage compressor. The two-stage compressor can operate at a first stage using limited power or a second stage requiring full power. The operation of the additional device's 108 two-stage compressor is chosen depending on the current load drawn by device 106 and the load constraint of the power source 104, wherein the operation of the device 108 is based on the parameter related to the target temperature of the device 106.

In other embodiments, when device 106 is activated to achieve or maintain a temperature (e.g., the parameter), the additional device 108 can run on reduced power in order to keep the current load of the system 100 within a load constraint of the power source 104. In the case of an additional device 108 with a two-stage compressor, the compressor can operate on reduced power by running at the first stage. In another embodiment, when device 106 is activated to achieve or maintain a temperature (e.g., the parameter in this example), the additional device 108 can operate with reduced functionality. For example, the additional device 108 can operate without certain features (e.g., a rotating motor, display lights, heat source, display screen, cold source, among others).

In a further embodiment, additional device 108 can include a heating element. In this embodiment, power manager component 102 can provide reduced power to the additional device 108 when device 106 is powered on, in order to maintain the total current of the system 100 below the power source 104 load current load constraint. Accordingly, the amount of power reduction is implemented based on the current load drawn by device 106 and the load constraint of the power source 104 in order to maintain the parameter for the device 106.

The power manager component 102 can include a setting that allows for active or in-use times for the device 106 and the additional devices 108. In particular, the setting can be time frames in which the system 100 will be used to service customers or the device 106 and the additional devices 108 will be in use. Based on this setting, the power manager component 102 can allow the device 106 to store energy (e.g., heat, cold, etc.) to prepare or be at or above the parameter prior to the active or in-use times. In other words, the power manager component 102 can divert all power from the power source 104 to the device 106 while the additional devices 108 are powered off so long as the setting is not in the in-use time or active time. In another example, the setting can be a duration of time in which the device 106 or the additional device 108 will not be in use or active (e.g., a night or sleep mode). The power manager component 102 can allow the device 106 to charge and prepare for daytime use while the additional devices 108 are powered off during the night or sleep mode. Power manager component 102 can utilize the setting for active or non-active times, wherein the setting is pre-defined, preprogramed, user defined, user activated, time initiated, among others.

Figure 2:
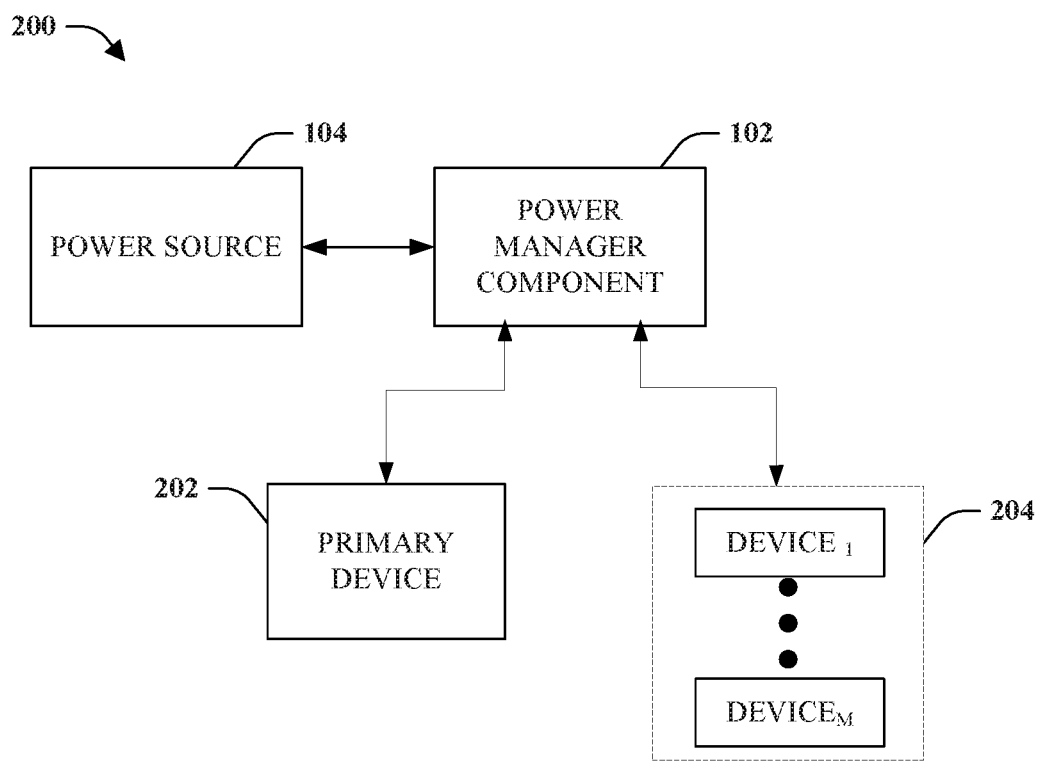
FIG. 2 is an illustration of a system that facilitates managing delivery of power for a device and an additional device in accordance with the subject innovation.

Turning to FIG. 2, a system 200 is illustrated in which the power manager component 102 can be configured to divert or direct power from a power source 104 to one or more additional devices 204 based on a parameter related to the primary device 202. The system 200 can include at least one primary device 202 that stores energy. The power manager component 102 can control power flow to the one or more additional devices 204 to allow the primary device 202 to reach and/or achieve the parameter (e.g., a set temperature inside a housing of the primary device 202, a temperature range, a set temperature with a tolerance or a threshold, a duration of time, a scheduled time or date, a detected motion within a storage area, an amount of product stored or housed within the device 106, a user input, among others). The operation of the primary device 202 takes priority over the operation of the one or more additional devices 204 in order to satisfy maintaining the parameter for the primary device 202. By way of example and not limitation, the primary device 202 can be any of a portable refrigerator, portable freezer, beverage cart, smoothie cart, an ice cream dipping cart, self-serve dipping cabinets, custard & juice stands, portable sink, portable water heater, shaved ice cart, snow cone cart, portable oven, among others. Moreover, it is to be appreciated that the system 200 can include two or more primary devices 202 in which a priority can be set for the two or more primary devices 202. By way of example and not limitation, the one or more additional devices 204 can be any of a portable refrigerator, portable freezer, beverage cart, smoothie cart, an ice cream dipping cart, self-serve dipping cabinets, custard & juice stands, portable sink, portable water heater, hot pretzel warmer/display, hot dog warmer/display, popcorn machine, cappuccino machine, shaved ice cart, snow cone cart, portable oven, portable stove, portable grill, soup kettle, nacho cart, among others.

The one or more additional devices 204 can be controlled by on/off controls, can be run in a reduced power state, or can be operated with reduced functionality depending on the type of device. For example, cooling, freezing, and refrigeration devices generally include a compressor that is either on or off. In one example, the primary device 202 is an electric water heater (heat-storing device) and an additional device 204 is a freezer. While the freezer is running, the power manager component 102 can evaluate the parameter for the primary device 202 (here, the electric water heater) and determine that the water heater must be activated to achieve or meet the parameter. Therefore, the power manager component 102 activates the water heater and deactivates the freezer (e.g., diverts power or deactivates power from the freezer to allow the water heater to activate while not overloading a current flow for the system).

In other example, the power manager component 102 can reduce power for additional devices 204 in order to maintain the parameter for the primary device 202. The additional devices 204 can be heating or warming devices that include a heating element that can be placed in a reduced power state by the power manager component 102. A heating or warming device can be provided with a current that is anywhere between 0% and 100% of the heating or warming device's rated full load current. For example, the primary device 202 can be an electric water heater (e.g., heat-storing device) and an additional device 204 can be a soup kettle and the parameter can be a temperature setting for the water being heated by the water heater. While the soup kettle is running and warming soup, the power manager component 102 can monitor the parameter for the electric water heater to identify that the water heater must be activated to maintain the temperature (e.g., parameter). In order to maintain the current load of the system, the power manager component 102 can activate the water heater and reduce the power to the soup kettle. This reduced power control is discussed in more detail in FIG. 4.

Certain additional devices 204 include multiple components each providing individual functionality. In an example, the primary device 202 is an electric water heater (e.g., heat-storing device) and an additional device 204 is a pretzel warmer and the parameter is a temperature setting for the water that is heated by the water heater. The pretzel warmer can include multiple components such as a warming lamp, a display light, and a motor that rotates the pretzels. While the pretzel warmer is consuming power for each of its components, the power manager component 102 can evaluate the parameter and ascertain that the water is not at the set temperature (e.g., parameter). Based on the parameter, the power manager component 102 can reduce power consumption of the pretzel warmer by turning off one or more components of the pretzel warmer so that the water heater can be turned on to achieve or maintain the parameter for the water temperature. For example, the functionality of the pretzel warmer can be changed by turning off the warming lamp while still supplying power to the display light and motor.

In a further non-limiting example, the power manager component 102 can be supplied by the power source 104 which is restricted by a 15 amp circuit. The power manager component 102 can be electrically coupled to a portable freezer, a pretzel warmer, and a soup kettle, wherein the power source 104 is electrically coupled to the power manager component 102 to provide power. The portable freezer can be configured to maintain a temperature of 0° F. (e.g., the parameter). In this example, the parameter is a target temperature for the portable freezer (the primary device 204) and the one or more additional devices 204 are the pretzel warmer and the soup kettle. When the temperature of the freezer is above 0° F., the power manager component 102 activates the freezer to lower the temperature. In order to activate the freezer, the power manager component 102 can control the power to the pretzel warmer and/or soup kettle in order to keep the system's total load below 15 amps. In particular, the power manager component 102 can control power to the pretzel warmer and/or soup kettle by turning off power, reducing power, reducing functionality of the pretzel warmer, reducing functionality of the soup kettle, a combination thereof, and the like. For example, if the freezer requires 10 amps while it is cooling, and the pretzel warmer and soup kettle each require 5 amps at full load, the power manager component 102 can either reduce the current to each of the pretzel warmer and soup kettle (e.g. to 2 amps), or turn off at least one of the pretzel warmer or the soup kettle while the freezer is cooling, thus keeping the total system load below 15 amps while allowing the freezer (primary device 202) to achieve the target temperature (or other parameter).

Continuing with the above example, the additional device 204 can have different internal subcomponents or features. In this embodiment, the additional device 204 can be operated with reduced functionality (e.g., turning off internal subcomponents or features) to allow the freezer (primary device 202) to achieve the target temperature (e.g., the parameter). For example, the pretzel warmer can be operated in a reduced power state and with reduced functionality such that the pretzel warmer may still run the motor (that rotates the pretzels) and have the heating element powered off or running at reduced power.

It should be appreciated that a deactivation (e.g., turning off, terminating power or electric current delivery, etc.), a power reduction, or a reduction in functionality implemented by the power manager component 102 creates a power gain for the system 200. This power gain can be utilized by the system 200 to be rerouted or delivered to the primary device 202 in order to reach or maintain a set temperature. By utilizing the power gain or current gain and rerouting, the power manager component 102 can maintain the system current supplied by the power source 104 within the maximum current level of the power source 104.

Figure 3:
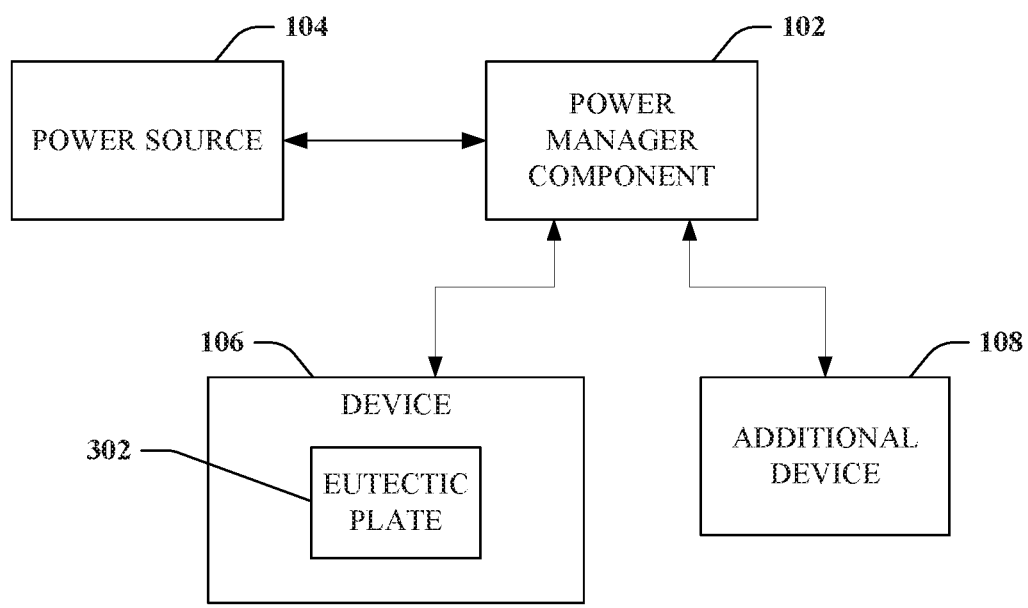
FIG. 3 is an illustration of a system that facilitates managing delivery of power for a device and an additional device in accordance with the subject innovation.

Turning to FIG. 3, the device 106 is illustrated that includes an eutectic plate 302. The eutectic plate 302 can generate heat or cold upon receiving power directly from the power source 104 or indirectly from the power source 104 via the device 106. The eutectic plate 302 can be comprised of a container holding a solution or material that holds or releases coldness or heat. For example, a cold eutectic plate can be a container with salt water that freezes at some temperature below 32 degrees.

The power manager component 102 can receive a set temperature or a range of temperatures that the device 106 is to maintain in a storage area or container. The power manager component 102 or a temperature component can detect a temperature of the device 106. Upon achieving the set temperature for the device 106 by directing power from the power source 104 to the eutectic plate 302, the power manager component 102 can switch or re-direct power, supplied by the power source 104, from the device 106 and the eutectic plate 302 to the additional device 108 or other devices. If the temperature with the device 106 is detected to not be the set temperature or out of the threshold, range, or tolerance, the power manager component 102 can re-direct or switch the power from the power source 104 back to the device 106 and the eutectic plate 302 from the additional device 108 or other devices.

The power manager component 102 can be a stand-alone component (as depicted), integrated into the power source 104, or a combination thereof. In still another embodiment, the power manager component 102 can be integrated into the power source 104, the device 106, the additional device 108, one or more devices, or a combination thereof. It should be further appreciated that the power manager component 102 can include a plurality of subcomponents that can individually be integrated into the power source 104, the device 106, the additional device 108, one or more devices or a combination thereof in such a way as to form a network.

In an embodiment, the power manager component 102 can utilize wireless communications such as, but not limited to, Bluetooth®, radio frequencies, cellular, NFC, among others. In another embodiment, the device 106 can be a refrigerated appliance with an integrated holdover or cold plate. The power manager component 102 can control power flow from the power source 104 such that only one of the device 106 or the additional device 108 is receiving power from the power source 104 at one time, the additional device 108 is receiving reduced power, or the additional device 108 is operating with reduced functionality.

The power source 104 can be configured to receive AC power (e.g. from a wall receptacle) or DC power (e.g., from a battery), or a combination thereof. The power source 104 can supply electricity to the power manager component 102 that has a current load constraint depending on the associated power system. For example, the power manager component 102 can be configured to receive power from a 3-wire 115 volt power source 104 providing anywhere between a 15 and 20 amp circuit. In other embodiments, the power manager component 102 can be configured to receive power from a 4-wire 208-230 volt power source 104. The power source 104 can distribute electric power to one or more devices 204 in accordance with the power manager component 102 control of the power consumption based on the parameter.

The power manager component 102 can communicate the switching of the power delivery between the device 106 and the additional device 108 via wired communications, wireless communications, or a combination thereof.

In an embodiment, the system 100 can include a temperature monitor for one or more devices 204 in order to determine the temperature within the one or more devices 204. It is to be appreciated that the set temperature can include a threshold or tolerance. For example, a temperature of 32 degrees Fahrenheit can include a threshold or tolerance of ±five percent (±5%) which provides the set temperature with a range of 30.25 degrees to 33.75 degrees. It is to be appreciated that the threshold or tolerance can be based on a type of device, a type of eutectic plate, specifications of the device, specifications of the eutectic plate, or a combination thereof.

The system 100 can track data related to the delivery of power and can include information such as, but not limited to, time of switching between devices, amount of power consumed, error data, among others.

The system 100 can include a notification system in which a notification is communicated to indicate a switch from the device 106 to the additional device 108 and/or from the additional device 108 to the device 106. The notification can be audible, visual, haptic, among others. In another example, the notification can be a text message, an email, or other electronic communication.

Figure 4:
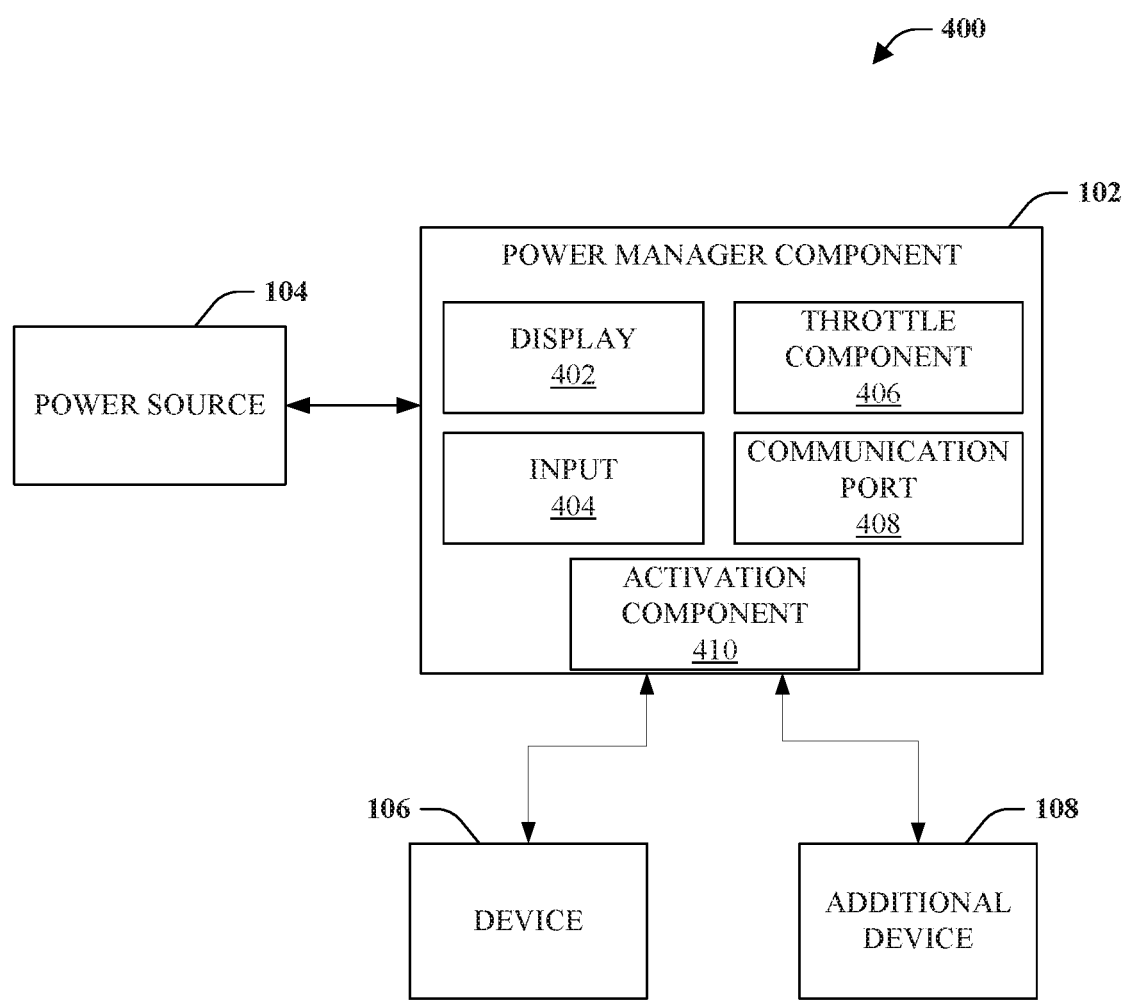
FIG. 4 is an illustration of a system that facilitates managing delivery of power for a device and an additional device in accordance with the subject innovation.

Turning now to FIG. 4, a system 400 is illustrated that includes the power manager component 102 that manages power to a plurality of devices based on a parameter in order to maintain a power draw from the power source 104. The power manager component 102 can include, but is not limited to including, a display 402, an input 404, a throttle component 406, a communication port 408, and an activation component 410.

By way of example and not limitation, the display 402 can be a liquid crystal display (LCD), light emitting diode (LED) display, touchscreen display, analog gauges, digital displays, light indicators, among others. The display 402 can generate imagery and information that can include, for instance, one or more power parameters, graphics, text, words, letters, numbers, and the like. The information can include, for instance, voltage, current, or power associated with the system 400 or each individual device (e.g., device 106, additional device(s) 108). The display 402 can also provide information related to information such as power source 104 current load constraint, temperature set points, device parameters, power reduction factors, and other device information.

The input 404 can be configured to receive an input, and in particular, an input from a user related to a setting or other data related to the system 400. By way of example, the input 404 can be an interface such as a touch screen, keyboard, mouse, buttons, switches, microphone, camera, motion sensor, or the like. Input can be physically integrated into power management component 102 or it can also exist remotely, communicating with the power management component 102 by way of a network connection or other data connection. Input 404 can be used to program and/or deliver information to system 400, and in particular the power manager component 102 for example.

In some embodiments, the power manager component 102 can include predefined (e.g., preloaded), dynamically defined (e.g., defined and identified while the power component 102 is managing power from the power source 104), or adjusted settings (e.g., set and then changed). Settings can include parameters used to define operation of device 106 (e.g. target temperature, duration of time, etc.), information regarding the device(s) 106 and additional devices 108 that are connected (e.g. type of device, power reduction factor, etc.), information about the power source 104 (e.g. voltage, current load constraint, etc.), among others. The settings can be communicated to the system 400. In particular, the settings can be communicated to the power management component 102 using the input 404, a communication port 408 (discussed below), via the Internet, a data communication technique, among others. In other embodiments, the settings can be communicated to the power manager component 102 with a portable computer memory such as a Universal Serial Bus (USB) memory drive, a disk, or a Secure Digital (SD) card.

For example, the system 400 can include a portable refrigeration device, a nacho cheese warmer, and a pretzel warmer each connected to the power manager component 102 which receives power from the power source 104. Primary device 106 is the portable refrigeration device, and additional devices 108 are the nacho cheese warmer and the pretzel warmer. The power management component 102 can contain the settings necessary for system 400 to operate. In this example, the settings are predefined and can include a target temperature for the refrigerator, power source 104 information such as load constraints and load capacity, and power reduction settings for each additional device 108. The settings can include a target temperature of 36° F. for the refrigerator, a 15 amp system current load constraint, a 50% power reduction command for the nacho cheese warmer, and a 30% power reduction command for the pretzel warmer when the refrigerator is commanded on. Because the settings are predefined, the system 400 is fully operable once the user connects each device 106 and additional device 108 to the power manager component 102.

The power manager component 102 can include a throttle component 406. The throttle component 406 can be configured to control power reduction or reduced functionality of the additional devices 108. Throttle component 406 can include a solid state relay that outputs power using a switched output. The switched output of the solid state relay results in a pulse width modulated current that can reduce the power to an additional device 108.

For example, an additional device 108 includes a heating element and the additional device is commanded by the power manager component 102 to run on reduced power. Throttle component 406 creates a pulse width modulated current signal that is sent to the additional device 108. The percentage of power reduction is varied by adjusting the ratio of pulsed-on time to pulsed-off time over a single cycle of the current waveform. For example, at 50% power output, the heating element is on (receiving power) half the time and off (not receiving power) half the time during a single current cycle. To reduce the power provided to the additional device 108 to the predetermined level, throttle component 406 reduces the ratio of pulsed time on to time off.

The communication port 408 can be a network card, a Wi-Fi card, a Bluetooth transmitter/receiver, a USB port, a serial port, an Ethernet port, among others. The communication port 408 can be separate from input 404 or it can be partially or fully integrated with input 404. Communication port 408 can allow remote or local access to install new settings, software/firmware, update settings, view power parameters or settings, or remotely control operation of the system 400. Wired or wireless communications allow the power manager component 102 to monitor status and temperatures of devices 106 or additional devices 108 to ensure proper operation.

The power manager component 102 can include an activation component 410. The activation component 410 can activate or deactivate a device 106 or additional device 108. The activation component 410 can be a digital output, a relay, a power relay, a switch, among others.

The combination and integration of components with the power manager component 102 can be chosen by sound engineering judgment and is to not to be limiting on the subject innovation. It is to be appreciated that the display 402 can be integrated into the power manager component 102 (as depicted), a stand-alone component, or a combination thereof. It is to be appreciated that the throttle component 406 can be integrated into the power manager component 102 (as depicted), a stand-alone component, or a combination thereof. It is to be appreciated that the input 404 can be integrated into the power manager component 102 (as depicted), a stand-alone component, or a combination thereof. It is to be appreciated that the communication port 408 can be integrated into the power manager component 102 (as depicted), a stand-alone component, or a combination thereof. It is to be appreciated that the activation component 410 can be integrated into the power manager component 102 (as depicted), a stand-alone component, or a combination thereof.

Figure 5:
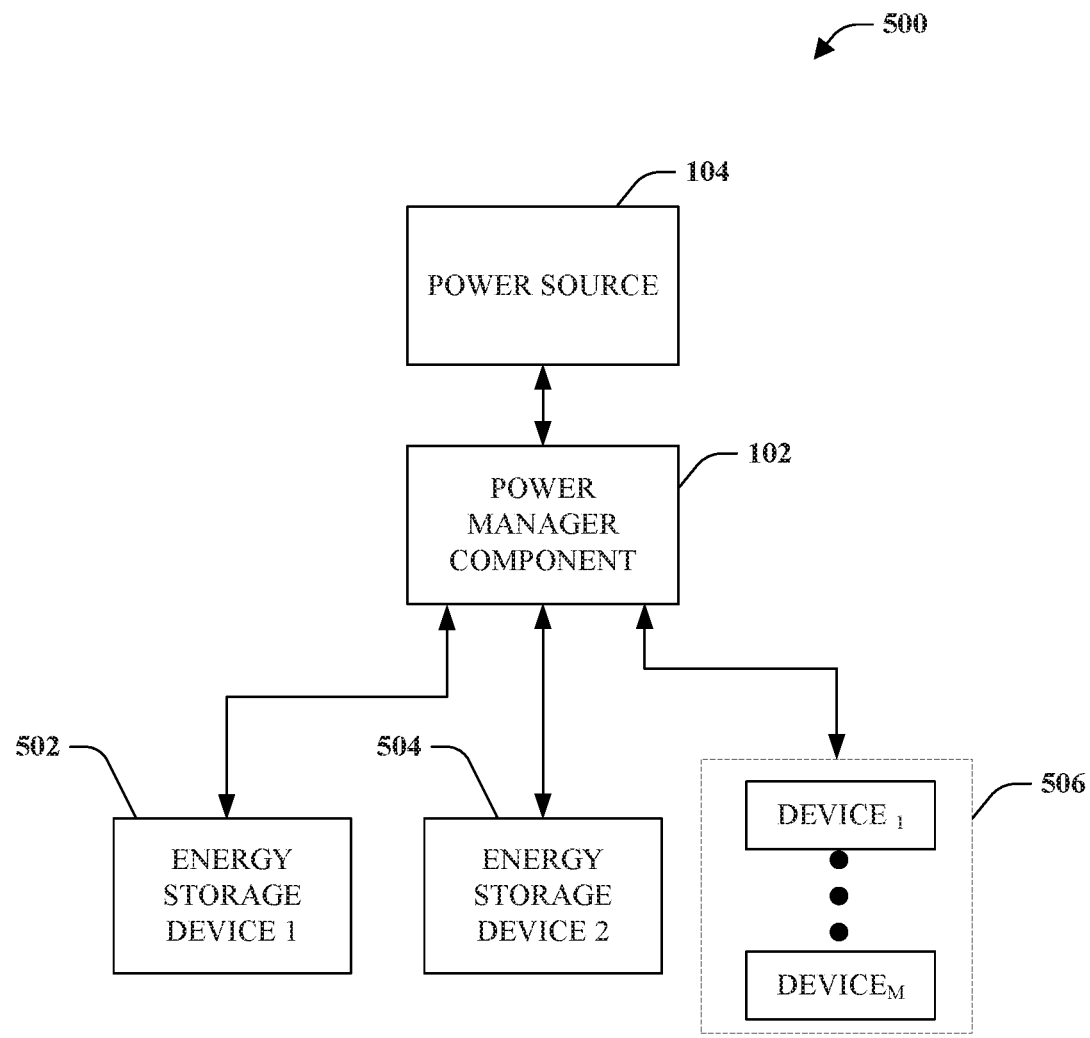
FIG. 5 is an illustration of a system that facilitates managing delivery of power for multiple energy storage devices and additional devices in accordance with the subject innovation.

In an embodiment of the system 500, depicted in FIG. 5, there can be multiple energy storage devices (502, 504). In this embodiment, if energy storage device 1 (502) and energy storage device 2 (504) can both run at full load and maintain a total system current within the current load constraint of power source 104, power manager component 102 can allow both energy storage devices (502, 504) to run at the same time if necessary to reach either device's target temperature (e.g., set parameter). If both energy storage devices (502, 504) cannot run at the same time without exceeding the power source 104 current load constraint, power manager component 102 can coordinate on/off operation of the energy storage devices (502, 504) so that both are not running at the same time. In either instance, power manager component 102 can continue to operate additional devices 506 in such a way that allows energy storage devices (502, 504) to reach and/or maintain their respective temperature based on their associated target temperature or other parameters while keeping the total system current load below the current load constraint of the power source 104. Power manager component 102 can accomplish this by powering off additional devices 506, operating additional devices 506 on reduced power, or operating additional devices 506 with reduced functionality.

The aforementioned systems, components, (e.g., power manager component 102, the power source 104, among others), and the like have been described with respect to interaction between several components and/or elements. It should be appreciated that such devices and elements can include those elements or sub-elements specified therein, some of the specified elements or sub-elements, and/or additional elements. Further yet, one or more elements and/or sub-elements may be combined into a single component to provide aggregate functionality. The elements may also interact with one or more other elements not specifically described herein.

In an embodiment, a system comprises a power source that is configured to deliver power by supplying an electrical current within a maximum current limit, a primary device that is configured to store heat or cold, an additional device, and a power manager component that is configured to control delivery of power to the primary device and the additional device such that the electrical current is maintained within the maximum current limit of the power source while maintaining a temperature inside the primary device. In this embodiment, the power manager component can activate the primary device based on a parameter. The parameter can be at least one of a set temperature within the primary device, a temperature range for inside the primary device, a set temperature for a content inside the primary device, a set temperature with a tolerance or a threshold, a duration of time, a scheduled time or date, a detected motion within a designated location about the primary device, an amount of product stored or housed within the primary device, or a user input. In this embodiment, the primary device can be one of a portable refrigerator, a portable freezer, a portable water heater, a beverage cart, a smoothie cart, an ice cream dipping cart, a self-serve dipping cabinet, a custard stand, a juice stand, a portable sink, a shaved ice cart, a snow cone cart, a hot food service station, a cold food service station, or a portable oven. Also in this embodiment, the additional device can be one of a hot pretzel warmer, a hot dog warmer, a popcorn machine, a cappuccino machine, a portable oven, a portable stove, a portable grill, a soup kettle, or a nacho cart.

In an embodiment, the power manager component can be configured to control delivery of power by deactivating the additional device and activate the primary device in order to maintain the temperature and maintain the electrical current within the maximum current limit. In another embodiment, the power manager component can be configured to control delivery of power by reducing power supplied to the additional device from a first amount of power to a second amount of power to activate the primary device to maintain the temperature and maintain the electrical current within the maximum current limit. The second amount of power is less than the first amount and allows the additional device to function at a reduced powered state.

In another embodiment, the power manager component can be configured to control delivery of power by reducing functionality of the additional device by controlling power to one or more individual components of the additional device to activate the primary device to maintain the temperature and maintain the electrical current within the maximum current limit. In this embodiment, the power manager component can be configured to control power to the one or more individual components of the additional device by reducing power supplied to the one or more individual components from a first amount of power to a second amount of power. The second amount of power is less than the first amount and allows the additional device to function at a reduced powered state. In another related embodiment, the power manager component can be configured to control power to the one or more individual components of the additional device by deactivating the one or more individual components of the additional device.

In a different embodiment, a system comprises a power source that is configured to supply an electrical current within a maximum current limit, a primary device that is configured to store heat or cold, an additional device, and a power manager component that is configured to control delivery of current to the primary device and the additional device such that the electrical current is maintained within the maximum current limit while maintaining a temperature inside the primary device. The power manager component comprises a throttle component that is configured to receive a portion of the electrical current from the power source and output a pulse width modulated signal of the portion of the electrical current to utilize with the additional device, wherein the pulse width modulated signal can be adjusted to reduce current consumption of the additional device from a first amount to a second amount. A difference between the first amount and the second amount of current can be delivered to the primary device.

In this embodiment, the power manager component can be configured to control delivery of current by deactivating the additional device to activate the primary device to maintain the temperature and maintain the electrical current within the maximum current limit based on the deactivation of the additional device. In another related embodiment, the power manager component can be configured to control delivery of current by reducing functionality of the additional device by controlling current to one or more individual components of the additional device to reroute current gained from the reduced functionality to the primary device for activation in order to maintain the temperature and maintain the electrical current within the maximum current limit based on the rerouted current.

Figure 6:
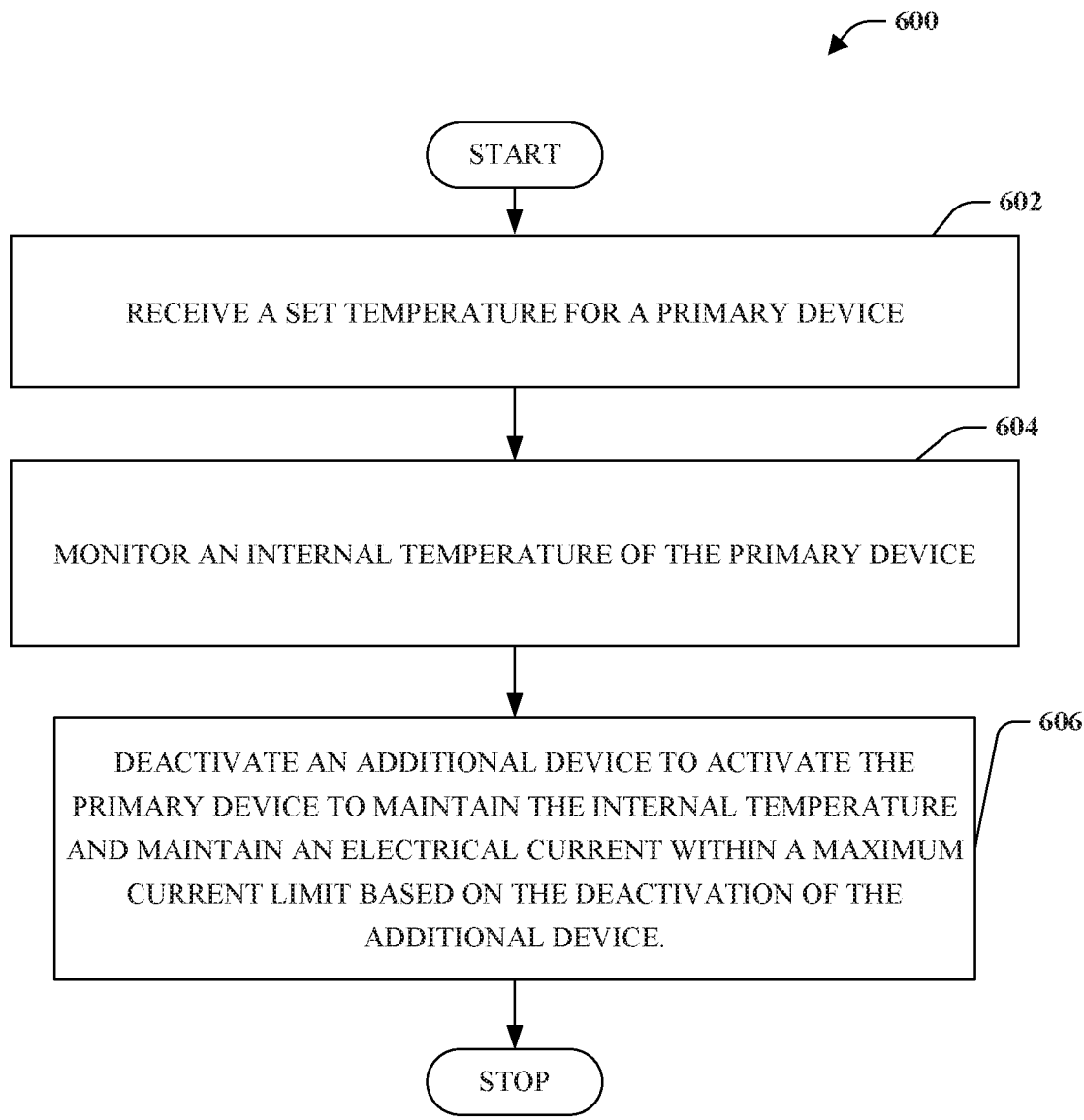
FIG. 6 is an illustration of a flow chart of an embodiment of a method that facilitates managing delivery of power for a device and an additional device.
Figure 7:
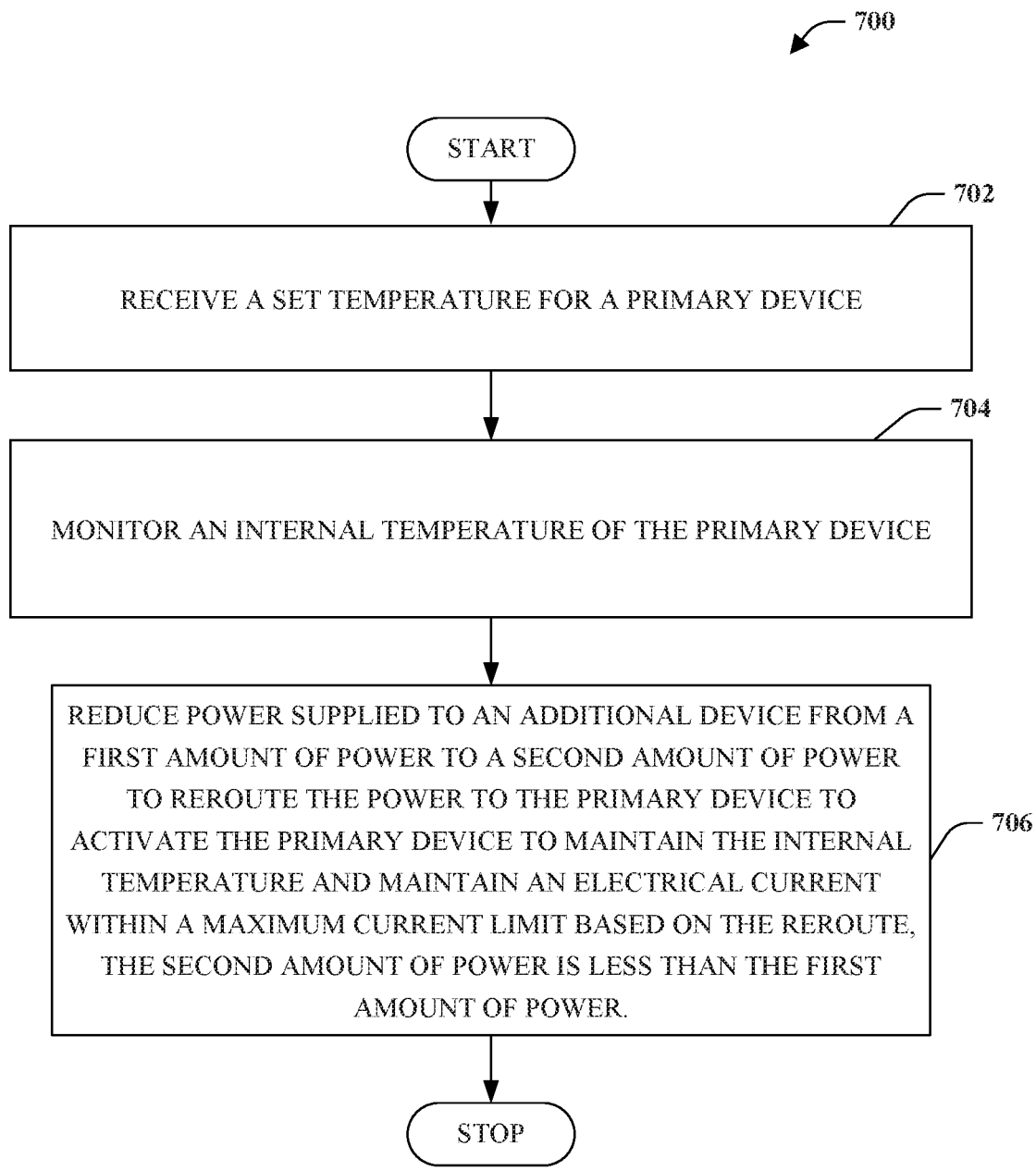
FIG. 7 is an illustration of a flow chart of an embodiment of a method that facilitates managing delivery of power for a device and an additional device.
Figure 8:
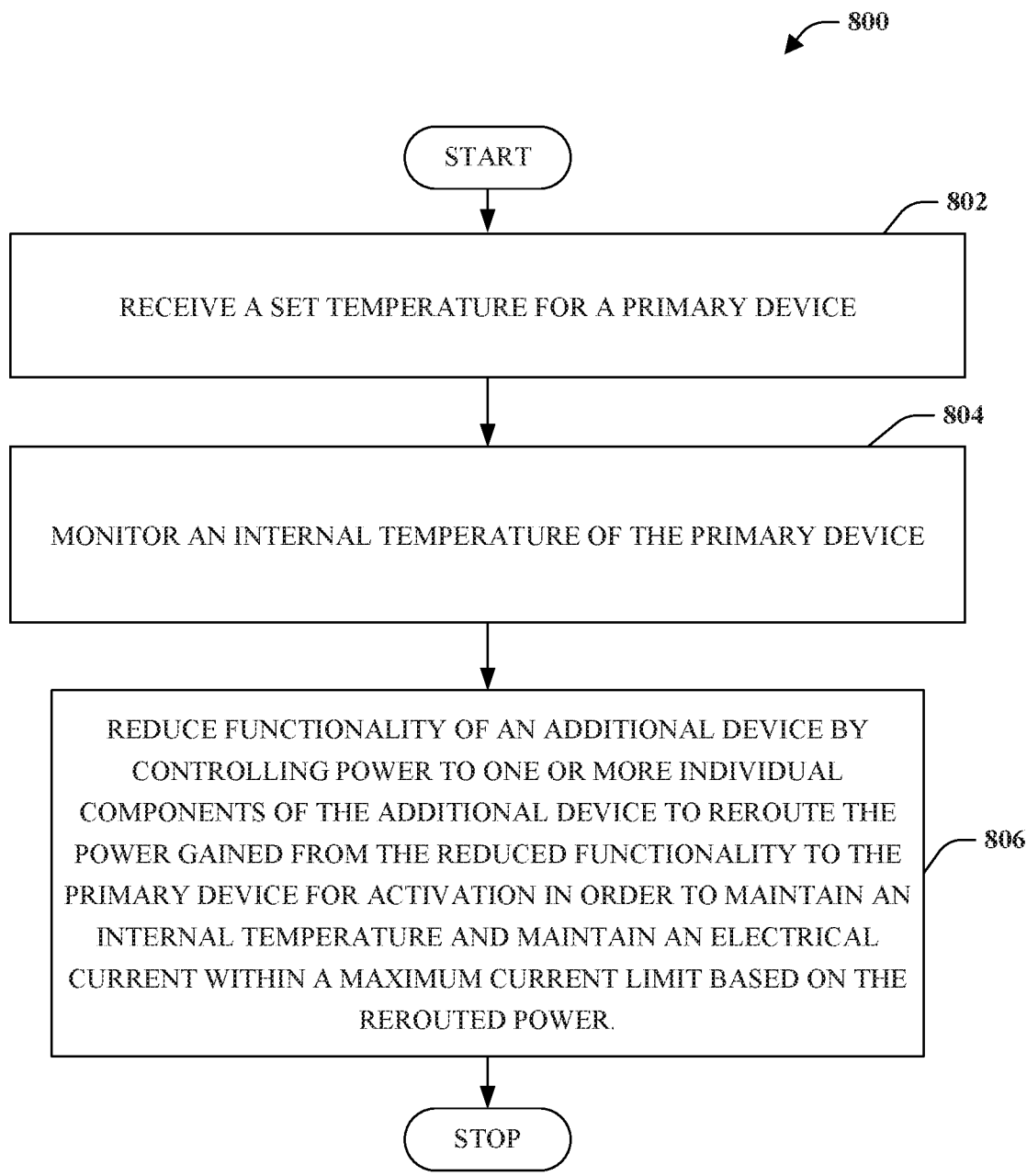
FIG. 8 is an illustration of a flow chart of an embodiment of a method that facilitates managing delivery of power for a device and an additional device.

In view of the exemplary devices and elements described supra, methodologies that may be implemented in accordance with the disclosed subject matter will be better appreciated with reference to the flow charts of FIG. 6, FIG. 7, and FIG. 8. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described hereinafter.

FIG. 6 illustrates a method in accordance with the subject innovation. At reference numeral 602, a set temperature can be received for a primary device. By way of example and not limitation, the set temperature can be received via an Internet communication, a memory, pre-defined, user input, among others. At reference numeral 604, an internal temperature of the primary device is monitored. At reference numeral 606, the additional device is deactivated to activate the primary device to maintain the internal temperature, and maintain the electrical current within the maximum current limit based on the deactivation of the additional device.

FIG. 7 illustrates a method in accordance with the subject innovation. At reference numeral 702, a set temperature can be received for a primary device. By way of example and not limitation, the set temperature can be received via an Internet communication, a memory, pre-defined, user input, among others. At reference numeral 704, an internal temperature of the primary device is monitored. At reference numeral 706, the power is reduced to an additional device from a first amount of power to a second amount of power to reroute the power to the primary device to activate the primary device to maintain the internal temperature and maintain the electrical current within the maximum current limit based on the reroute, the second amount of power is less than the first amount of power.

FIG. 8 illustrates a method in accordance with the subject innovation. At reference numeral 802, a set temperature can be received for a primary device. By way of example and not limitation, the set temperature can be received via an Internet communication, a memory, pre-defined, user input, among others. At reference numeral 804, an internal temperature of the primary device is monitored. At reference numeral 806, the functionality of an additional device is reduced by controlling power to one or more individual components of the additional device to reroute the power gained from the reduced functionality to the primary device for activation in order to maintain the electrical current with the maximum current limit based on the rerouted power.

In an embodiment, a method comprises receiving a set temperature for a primary device, monitoring an internal temperature of the primary device, and controlling delivery of power from a power source to the primary device and an additional device such that an electrical current supplied by the power source is maintained within a maximum current limit of the power source while maintaining the internal temperature of the primary device based on the set temperature.

As used herein, the terms "component" and "system," as well as forms thereof are intended to refer to a computer-related entity, either hardware, a combination of hardware and software, software, or software in execution. For example, a component may be, but is not limited to being, a process running on a processor, a processor, an object, an instance, an executable, a thread of execution, a program, and/or a computer. By way of illustration, both an application running on a computer and the computer can be a component. One or more components may reside within a process and/or thread of execution and a component may be localized on one computer and/or distributed between two or more computers.

The word "exemplary" or various forms thereof are used herein to mean serving as an example, instance, or illustration. Any aspect or design described herein as "exemplary" is not necessarily to be construed as preferred or advantageous over other aspects or designs. Furthermore, examples are provided solely for purposes of clarity and understanding and are not meant to limit or restrict the claimed subject matter or relevant portions of this disclosure in any manner. It is to be appreciated a myriad of additional or alternate examples of varying scope could have been presented, but have been omitted for purposes of brevity.

Furthermore, to the extent that the terms "includes," "contains," "has," "having" or variations in form thereof are used in either the detailed description or the claims, such terms are intended to be inclusive in a manner similar to the term "comprising" as "comprising" is interpreted when employed as a transitional word in a claim.

In order to provide a context for the claimed subject matter, FIG. 8 as well as the following discussion are intended to provide a brief, general description of a suitable environment in which various aspects of the subject matter can be implemented. The suitable environment, however, is only an example and is not intended to suggest any limitation as to scope of use or functionality.

While the above disclosed system and methods can be described in the general context of computer-executable instructions of a program that runs on one or more computers, those skilled in the art will recognize that aspects can also be implemented in combination with other program modules or the like. Generally, program modules include routines, programs, components, data structures, among other things that perform particular tasks and/or implement particular abstract data types. Moreover, those skilled in the art will appreciate that the above systems and methods can be practiced with various computer system configurations, including single-processor, multi-processor or multi-core processor computer systems, mini-computing devices, mainframe computers, as well as personal computers, hand-held computing devices (e.g., personal digital assistant (PDA), portable gaming device, smartphone, tablet, Wi-Fi device, laptop, phone, among others), microprocessor-based or programmable consumer or industrial electronics, and the like. Aspects can also be practiced in distributed computing environments where tasks are performed by remote processing devices that are linked through a communications network. However, some, if not all aspects of the claimed subject matter can be practiced on stand-alone computers. In a distributed computing environment, program modules may be located in one or both of local and remote memory storage devices.

Figure 9:
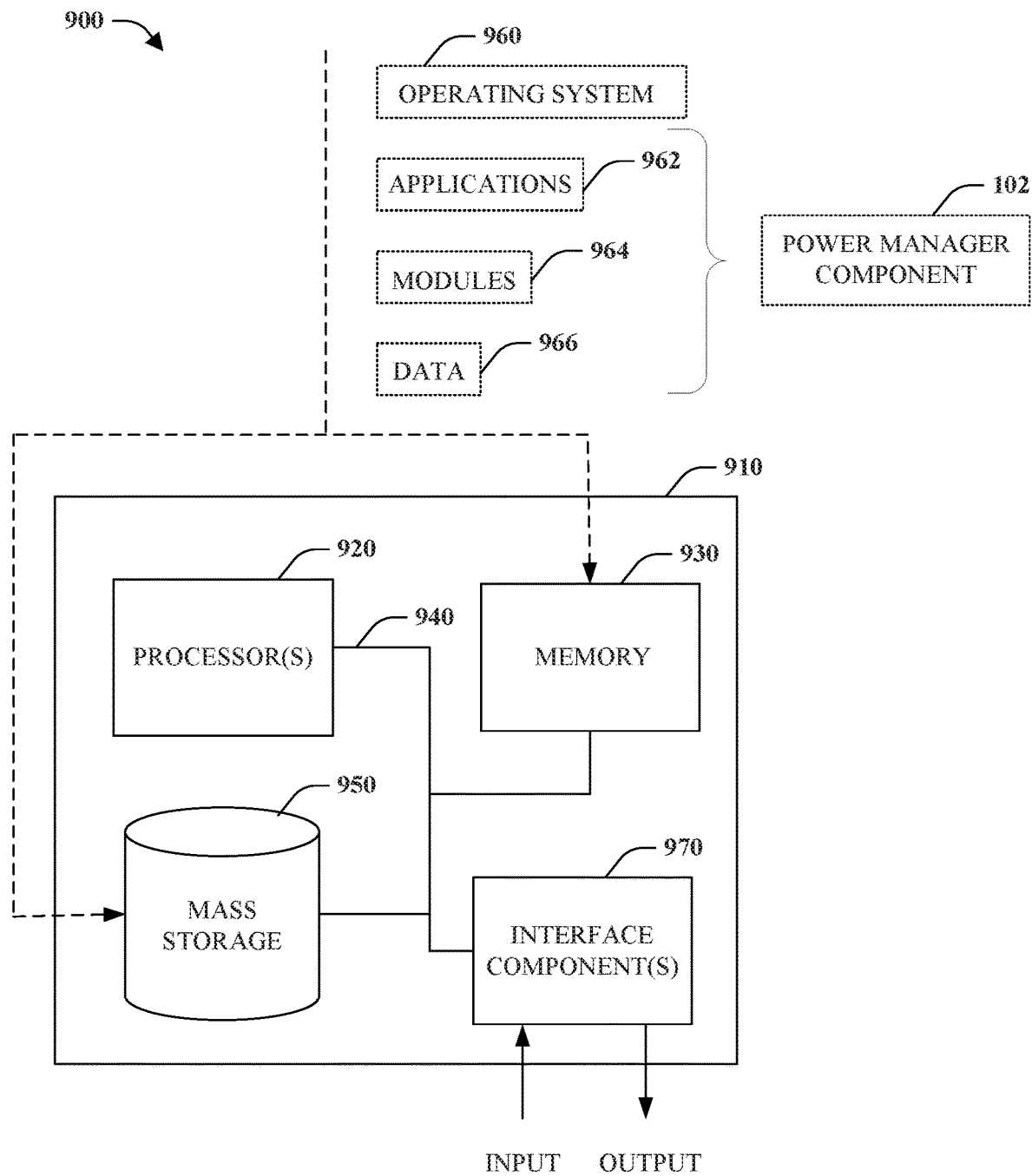
FIG. 9 is a schematic block diagram illustrating a suitable operating environment for aspects of the subject innovation.

With reference to FIG. 9, illustrated is an example general-purpose computer 910 or computing device (e.g., desktop, laptop, server, hand-held, programmable consumer or industrial electronics, set-top box, game system . . . ). The computer 910 includes one or more processor(s) 920, memory 930, system bus 940, mass storage 950, and one or more interface components 970. The system bus 940 communicatively couples at least the above system components. However, it is to be appreciated that in its simplest form the computer 910 can include one or more processors 920 coupled to memory 930 that execute various computer executable actions, instructions, and or components stored in memory 930.

The processor(s) 920 can be implemented with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. The processor(s) 920 may also be implemented as a combination of computing devices, for example a combination of a DSP and a microprocessor, a plurality of microprocessors, multi-core processors, one or more microprocessors in conjunction with a DSP core, or any other such configuration.

The computer 910 can include or otherwise interact with a variety of computer-readable media to facilitate control of the computer 910 to implement one or more aspects of the claimed subject matter. The computer-readable media can be any available media that can be accessed by the computer 910 and includes volatile and nonvolatile media, and removable and non-removable media. By way of example, and not limitation, computer-readable media may comprise computer storage media and communication media.

Computer storage media includes volatile and nonvolatile, removable and non-removable media implemented in any method or technology for storage of information such as computer-readable instructions, data structures, program modules, or other data. Computer storage media includes, but is not limited to memory devices (e.g., random access memory (RAM), read-only memory (ROM), electrically erasable programmable read-only memory (EEPROM) . . . ), magnetic storage devices (e.g., hard disk, floppy disk, cassettes, tape . . . ), optical disks (e.g., compact disk (CD), digital versatile disk (DVD) . . . ), and solid state devices (e.g., solid state drive (SSD), flash memory drive (e.g., card, stick, key drive . . . ) . . . ), or any other medium which can be used to store the desired information and which can be accessed by the computer 910.

Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 930 and mass storage 950 are examples of computer-readable storage media. Depending on the exact configuration and type of computing device, memory 930 may be volatile (e.g., RAM), non-volatile (e.g., ROM, flash memory . . . ) or some combination of the two. By way of example, the basic input/output system (BIOS), including basic routines to transfer information between elements within the computer 910, such as during start-up, can be stored in nonvolatile memory, while volatile memory can act as external cache memory to facilitate processing by the processor(s) 920, among other things.

Mass storage 950 includes removable/non-removable, volatile/non-volatile computer storage media for storage of large amounts of data relative to the memory 1030. For example, mass storage 950 includes, but is not limited to, one or more devices such as a magnetic or optical disk drive, floppy disk drive, flash memory, solid-state drive, or memory stick.

Memory 930 and mass storage 950 can include, or have stored therein, operating system 960, one or more applications 962, one or more program modules 964, and data 966. The operating system 960 acts to control and allocate resources of the computer 910. Applications 962 include one or both of system and application software and can exploit management of resources by the operating system 960 through program modules 964 and data 966 stored in memory 930 and/or mass storage 950 to perform one or more actions. Accordingly, applications 962 can turn a general-purpose computer 910 into a specialized machine in accordance with the logic provided thereby.

All or portions of the claimed subject matter can be implemented using standard programming and/or engineering techniques to produce software, firmware, hardware, or any combination thereof to control a computer to realize the disclosed functionality. By way of example and not limitation, the power manager component 102 (or portions thereof) can be, or form part, of an application 962, and include one or more modules 964 and data 966 stored in memory and/or mass storage 950 whose functionality can be realized when executed by one or more processor(s) 920. Moreover, it is to be appreciated that the software, firmware, or combination thereof to perform the functionality of the described components herein can be downloaded, installed, or a combination thereof from any host. For instance, the host can be an online store, a website, an IP address, an application store, a network, a storage medium, a portable hard disk, a server, or the Internet.

In accordance with one particular embodiment, the processor(s) 920 can correspond to a system on a chip (SOC) or like architecture including, or in other words integrating, both hardware and software on a single integrated circuit substrate. Here, the processor(s) 920 can include one or more processors as well as memory at least similar to processor(s) 920 and memory 930, among other things. Conventional processors include a minimal amount of hardware and software and rely extensively on external hardware and software. By contrast, an SOC implementation of processor is more powerful, as it embeds hardware and software therein that enable particular functionality with minimal or no reliance on external hardware and software. For example, the power manager component 102 (or portions thereof) can be embedded within hardware in a SOC architecture.

The computer 910 also includes one or more interface components 970 that are communicatively coupled to the system bus 940 and facilitate interaction with the computer 910. By way of example, the interface component 970 can be a port (e.g. serial, parallel, PCMCIA, USB, FireWire . . . ) or an interface card (e.g., sound, video . . . ) or the like. In one example implementation, the interface component 970 can be embodied as a user input/output interface to enable a user to enter commands and information into the computer 910 through one or more input devices (e.g., pointing device such as a mouse, trackball, stylus, touch pad, keyboard, microphone, joystick, game pad, satellite dish, scanner, camera, other computer . . . ). In another example implementation, the interface component 970 can be embodied as an output peripheral interface to source output to displays (e.g., CRT, LCD, plasma . . . ), speakers, printers, and/or other computers, among other things. Still further yet, the interface component 970 can be embodied as a network interface to enable communication with other computing devices (not shown), such as over a wired or wireless communications link.

In the specification and claims, reference will be made to a number of terms that have the following meanings. The singular forms "a", "an" and "the" include plural referents unless the context clearly dictates otherwise. Approximating language, as used herein throughout the specification and claims, may be applied to modify a quantitative representation that could permissibly vary without resulting in a change in the basic function to which it is related. Accordingly, a value modified by a term such as "about" is not to be limited to the precise value specified. In some instances, the approximating language may correspond to the precision of an instrument for measuring the value. Moreover, unless specifically stated otherwise, a use of the terms "first," "second," etc., do not denote an order or importance, but rather the terms "first," "second," etc., are used to distinguish one element from another.

As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances the modified term may sometimes not be appropriate, capable, or suitable. For example, in some circumstances an event or capacity can be expected, while in other circumstances the event or capacity cannot occur—this distinction is captured by the terms "may" and "may be."

This written description uses examples to disclose the invention, including the best mode, and also to enable one of ordinary skill in the art to practice the invention, including making and using a devices or systems and performing incorporated methods. The patentable scope of the invention is defined by the claims, and may include other examples that occur to one of ordinary skill in the art. Such other examples are intended to be within the scope of the claims if they have structural elements that do not differentiate from the literal language of the claims, or if they include equivalent structural elements with insubstantial differences from the literal language of the claims.

What is claimed is:

1. A system comprising:
   a power source that is configured to deliver power by supplying an electrical current within a maximum current limit;
   a primary device that is configured to store heat or cold;
   an additional device;
   an activation component configured to activate or de-activate the primary device or the additional device;
   a throttle component configured to reduce power to or reduce functionality to the primary device or the additional device; and
   a processor and a memory configured to provide computer program instructions to the processor, wherein the processor controls the throttle component or the activation component to control delivery of power to the primary device and the additional device such that the electrical current is maintained within the maximum current limit of the power source while maintaining a temperature inside the primary device within a temperature range by:
   re-directing the power from the primary device to the additional device by deactivating the primary device and activating the additional device while the temperature inside the primary device is within the temperature range; and
   re-directing the power from the additional device by reducing functionality to the additional device by deactivating one or more individual components of the additional device while maintaining power to one or more individual components of the additional device and activating the primary device when the temperature inside the primary device is outside the temperature range, such that the operation of the primary device takes priority over the operation of the additional device in order to satisfy the temperature range.

2. The system of claim 1, wherein the processor is further configured to activate the primary device based on a parameter that is at least one of a set temperature for a content inside the primary device, a set temperature with a tolerance or a threshold, a duration of time, a scheduled time or date, a detected motion within a designated location about the primary device, an amount of product stored or housed within the primary device, or a user input.

3. The system of claim 1, wherein the primary device is one of a portable refrigerator, a portable freezer, a portable water heater, a beverage cart, a smoothie cart, an ice cream dipping cart, a self-serve dipping cabinet, a custard stand, a juice stand, a portable sink, a shaved ice cart, a snow cone cart, a hot food service station, a cold food service station, or a portable oven.

4. The system of claim 1, wherein the additional device is one of a hot pretzel warmer, a hot dog warmer, a popcorn machine, a cappuccino machine, a portable oven, a portable stove, a portable grill, a soup kettle, or a nacho cart.

5. The system of claim 1, the processor is configured to control delivery of power by reducing power supplied to the additional device from a first amount of power to a second amount of power to activate the primary device in response to the temperature inside the primary device being outside the temperature range while maintaining the electrical current within the maximum current limit, wherein the second amount is less than the first amount and allows the additional device to function at a reduced powered state.

6. The system of claim 1, wherein the processor is configured to control power to the one or more individual components of the additional device by reducing power supplied to the one or more individual components from a first amount of power to a second amount of power, wherein the second amount is less than the first amount and allows the additional device to function at a reduced powered state.

7. The system of claim 1, wherein the processor is configured to control power to the one or more individual components of the additional device by deactivating the one or more individual components of the additional device while keeping active another individual component of the additional device.

8. The system of claim 1, further comprising:
   a second additional device, wherein the processor is further configured to control power to the second additional device by at least one of deactivating, reducing power to, or reducing functionality of the additional device and the second additional device by controlling power to one or more individual components of the additional device and the second additional device in response to the temperature inside the primary device being outside the temperature range; and
   a user interface, the user interface configured to receive the user input or to display data in relation to the power source, the primary device, the additional device, or the second additional device.

9. The system of claim 1, wherein the processor is configured to communicate wirelessly with the primary device and the additional device to receive the temperature inside the primary device from the primary device, and to control activation and deactivation of the primary device and the additional device.

10. A method comprising:
    receiving a temperature range for a primary device configured to cool a contents stored within the primary device;
    monitoring an internal temperature of the primary device;
    receiving a mode selection indicating one of an active mode or a night mode;
    controlling delivery of power from a power source to the primary device and an additional device such that an electrical current supplied by the power source is maintained within a maximum current limit of the power source while maintaining the internal temperature of the primary device within the temperature range during active mode by:
  re-directing the power from the primary device to the additional device by deactivating the primary device and activating the additional device while the temperature inside the primary device is within the temperature range; and
  re-directing the power from the additional device by deactivating, reducing power to, or reducing functionality to the additional device and activating the primary device when the temperature inside the primary device is outside the temperature range, such that the operation of the primary device takes priority over the operation of the additional device in order to satisfy the temperature range; and
allowing delivery of the power only to the primary device during night mode such that the internal temperature of the primary device is brought at least within the temperature range prior to entering active mode.

11. The method of claim 10, wherein the step of controlling includes reducing power supplied to the additional device from a first amount of power to a second amount of power to reroute the power to the primary device to activate the primary device in response to the internal temperature of the primary device being outside the temperature range while maintaining the electrical current within the maximum current limit based on the reroute, the second amount of power is less than the first amount of power.

12. The method of claim 10, wherein the step of controlling includes reducing functionality of the additional device by controlling power to one or more individual components of the additional device to reroute the power gained from the reduced functionality to the primary device for activation in response to the internal temperature of the primary device being outside the temperature range while maintaining the electrical current within the maximum current limit based on the rerouted power.

13. The method of claim 12, wherein the step of controlling power to one or more individual components includes reducing power supplied to the one or more individual components from a first amount of power to a second amount of power, the second amount of power is less than the first amount of power.

14. The method of claim 12, wherein the step of controlling power to one or more individual components includes deactivating the one or more individual components of the additional device while keeping active another individual component of the additional device.

15. The method of claim 10, wherein the processor communicates wirelessly with the primary device and the additional device to receive the internal temperature of the primary device from the primary device, and to control activation and deactivation of the primary device and the additional device.

16. A system comprising:
  a power source that is configured to supply an electrical current within a maximum current limit;
  a primary device that is configured to store cold;
  an additional device;
  a processor and a memory configured to provide computer program instructions to the processor, wherein the processor controls delivery of current to the primary device and the additional device such that the electrical current is maintained within the maximum current limit while maintaining a temperature inside the primary device within a temperature range by:
    re-directing the power from the primary device to the additional device by deactivating the primary device and activating the additional device while the temperature inside the primary device is within the temperature range; and
    re-directing the power from the additional device by deactivating, reducing power to, or reducing functionality to the additional device and activating the primary device when the temperature inside the primary device is outside the temperature range, such that the operation of the primary device takes priority over the operation of the additional device in order to satisfy the temperature range,
  a throttle component that is configured to receive a portion of the electrical current from the power source and output a pulse width modulated signal of the portion of the electrical current to utilize with the additional device, wherein the pulse width modulated signal can be adjusted to reduce current consumption of the additional device from a first amount to a second amount and a difference between the first amount and the second amount of current can be delivered to the primary device;
  an activation component that is configured to activate or deactivate the primary device or the additional device;
  a display to display power data corresponding to the power source, the primary device, or the additional device; and
  a notification system to indicate activation or deactivation of the primary device or the additional device.

17. The system of claim 16, wherein the processor is configured to control delivery of current by reducing functionality of the additional device by controlling current to one or more individual components of the additional device to reroute current gained from the reduced functionality to the primary device for activation in response to the temperature inside the primary device being outside the temperature range while maintaining the electrical current within the maximum current limit based on the rerouted current.

18. The system of claim 16, wherein the processor is configured to communicate wirelessly with the primary device and the additional device to receive the temperature inside the primary device from the primary device, and to control activation and deactivation of the primary device and the additional device.

* * * * *